US011474499B2

(12) United States Patent
Yamamoto

(10) Patent No.: US 11,474,499 B2
(45) Date of Patent: Oct. 18, 2022

(54) COMMUNICATION ROBOT AND CONTROL PROGRAM OF COMMUNICATION ROBOT

(71) Applicant: Toyota Jidosha Kabushiki Kaisha, Toyota (JP)

(72) Inventor: Takashi Yamamoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/659,858

(22) Filed: Oct. 22, 2019

(65) Prior Publication Data

US 2020/0133239 A1    Apr. 30, 2020

(30) Foreign Application Priority Data

Oct. 24, 2018  (JP) .............................. JP2018-199875

(51) Int. Cl.
   *G05B 19/4155*    (2006.01)
   *H04L 67/125*    (2022.01)
   (Continued)

(52) U.S. Cl.
   CPC ....... *G05B 19/4155* (2013.01); *G06F 3/0484* (2013.01); *G06F 3/167* (2013.01);
   (Continued)

(58) Field of Classification Search
   CPC ...... G05B 19/4155; G05B 2219/34456; H04L 67/125; H04L 67/36; G06F 3/0484; G06F 3/167; B25J 11/0005; B25J 13/00
   See application file for complete search history.

(56) References Cited

U.S. PATENT DOCUMENTS

2011/0218674 A1    9/2011  Stuart et al.
2011/0288682 A1*  11/2011  Pinter .................... B25J 11/009
                                                                    700/259

(Continued)

FOREIGN PATENT DOCUMENTS

JP    2000-237985 A    9/2000
JP    2004-261941 A    9/2004
(Continued)

OTHER PUBLICATIONS

Non-Final Office Action dated Sep. 14, 2021 in related U.S. Appl. No. 16/659,835.

(Continued)

*Primary Examiner* — Andrey Belousov
(74) *Attorney, Agent, or Firm* — Dinsmore & Shohl LLP

(57) ABSTRACT

A communication robot includes: an operation part; and a communication arbitration unit configured to exhibit one of a robot mode for autonomously operating the operation part by applying a first operational criterion and an avatar mode for operating the operation part based on an operation instruction sent from a remote operator by applying a second operational criterion to arbitrate communication with a service user, in which the communication arbitration unit operates, when it is intended to exhibit the avatar mode in accordance with an operation request from the remote operator, the operation part in the robot mode and asks the service user whether to allow the mode to be switched to the avatar mode.

14 Claims, 6 Drawing Sheets

(51) Int. Cl.
*G06F 3/0484* (2022.01)
*G06F 3/16* (2006.01)
*H04L 67/75* (2022.01)

(52) U.S. Cl.
CPC ............ *H04L 67/125* (2013.01); *H04L 67/75* (2022.05); *G05B 2219/34456* (2013.01)

(56) References Cited

U.S. PATENT DOCUMENTS

| | | |
|---|---|---|
| 2014/0139616 A1 | 5/2014 | Pinter et al. |
| 2017/0136628 A1 | 5/2017 | Inoue et al. |
| 2017/0206064 A1* | 7/2017 | Breazeal .................. G06F 8/36 |
| 2020/0130194 A1 | 4/2020 | Yamamoto |

FOREIGN PATENT DOCUMENTS

| | | |
|---|---|---|
| JP | 2007-125646 A | 5/2007 |
| JP | 2007-216363 A | 8/2007 |
| JP | 2009-131914 A | 6/2009 |
| JP | 2011-000681 A | 1/2011 |
| JP | 2011-093062 A | 5/2011 |
| JP | 5296898 B2 | 9/2013 |
| JP | 2016-068161 A | 5/2016 |
| JP | 5991557 B2 | 9/2016 |
| WO | 2016/002673 A1 | 1/2016 |
| WO | 2017/094332 A1 | 6/2017 |
| WO | 2017/171610 A1 | 10/2017 |

OTHER PUBLICATIONS

Office Action dated Mar. 30, 2022 in the related U.S. Appl. No. 16/659,835.
Notice of Allowance dated Jul. 28, 2022 in the related U.S. Appl. No. 16/659,835.

* cited by examiner

FIRST TABLE (ROBOT MODE)

| | |
|---|---|
| DISPLAY CHARACTER | NO.3 |
| VOICE TONE | NO.5 |
| DISPLAY COLOR | GREEN |
| CART MOVING SPEED | LOW |
| ARM MOVING SPEED | LOW |
| CONVERSATION SPEED | LOW |
| SELECTION TERM LEVEL | C |
| TEMPERAMENT CHANGE FREQUENCY | MIDDLE |
| GESTURE DURING CONVERSATION | MIDDLE |

SECOND TABLE (AVATAR MODE)

| | |
|---|---|
| DISPLAY CHARACTER | TRANSFER |
| VOICE TONE | TRANSFER |
| DISPLAY COLOR | BLUE |
| CART MOVING SPEED | HIGH |
| ARM MOVING SPEED | MIDDLE |
| CONVERSATION SPEED | — |
| SELECTION TERM LEVEL | — |
| TEMPERAMENT CHANGE FREQUENCY | LOW |
| GESTURE DURING CONVERSATION | SMALL |

Fig. 4

COMMUNICATION ROBOT AND CONTROL PROGRAM OF COMMUNICATION ROBOT

CROSS REFERENCE TO RELATED APPLICATIONS

This application is based upon and claims the benefit of priority from Japanese patent application No. 2018-199875, filed on Oct. 24, 2018, the disclosure of which is incorporated herein in its entirety by reference.

BACKGROUND

The present disclosure relates to a communication robot and a control program of a communication robot.

A communication robot that enables persons who are in places distant from each other to perform communication has been known (see, for example. Japanese Unexamined Patent Application Publication No, 2004-261941). Further, a communication robot capable of performing an autonomous operation such as talking to a person or working in accordance with an instruction given by a person has also been known (see, for example, Japanese Unexamined Patent Application Publication No. 2011-681).

SUMMARY

It is often difficult to prepare each of the above communication robots in an indoor environment where people live due to a problem, for example, that these communication robots occupy a large space. In order to solve this problem, there has been a growing need for one robot that provides a communication function of operating based on an operation instruction sent from a person who is in a remote place and a communication function that autonomously operates. However, while a user tends to feel an attachment for the communication robot that autonomously operates, the user is not likely to feel an attachment for the communication robot that is operated by the person who is in the remote place. When, in particular, one robot that serves as hardware includes these above two functions, the user feels as if, even when only one of the two functions is actually functioning, the other one of these functions is functioning, which may cause a situation in which he/she does not feel an attachment for the robot which is autonomously operating.

The present disclosure provides a technique for enabling the user to feel an attachment for the robot that is autonomously operating while achieving a communication function by an autonomous operation and a communication function by an operation based on an operation instruction given by a person who is in a remote place by one robot.

A communication robot according to a first aspect of the present disclosure includes: an operation part; and a communication arbitration unit configured to exhibit one of a robot mode for autonomously operating the operation part by applying a first operational criterion and an avatar mode for operating the operation part based on an operation instruction sent from a remote operator by applying a second operational criterion to arbitrate communication with a service user, in which the communication arbitration unit operates, when it is intended to exhibit the avatar mode in accordance with an operation request from the remote operator, the operation part in the robot mode and asks the service user whether to allow the mode to be switched to the avatar mode.

In this way, the communication robot is operated as if the robot mode is managing the mode switching, whereby it is possible to enable the user to have emotions such as intimacy and empathy for the robot mode, which have rarely occurred in forced interruption of the remote operation or switchover using a switch in related art. In particular, since the distinction between the robot mode and the avatar mode becomes clear, the user is able to separate a target for which the user feels an attachment and a target for which the user does not feel an attachment.

In the aforementioned communication robot, the communication arbitration unit presents information regarding the remote operator to the service user via an operation by the robot mode when it asks the service user whether to allow the mode to be switched. According to this operation, it is possible to cause the user to have an impression that the communication robot is operating in the robot mode until the user allows the mode to be switched. Further, the user is able to check the information on the remote operator, which enables the user to easily determine whether to accept the remote operation.

In this case, the communication arbitration unit changes an aspect in which the information is presented to the service user in accordance with an attribute of the remote operator. As an operation in the robot mode, for example, information may be presented in a friendly manner to a person who has performed the remote operation several times and with a sense of caution to a person who has never performed the remote operation before, whereby the quality of communication with the user in the robot mode is improved. Further, changing the aspect in which the information is presented to the service user in accordance with the attribute of the remote operator will also help the user to determine whether to allow the remote operation.

In the aforementioned communication robot, the communication arbitration unit causes, when the service user has allowed the mode to be switched to the avatar mode, the avatar mode to be exhibited after the communication arbitration unit executes an exit operation in the robot mode. If, for example, the mode is switched to the avatar mode after the communication robot utters "Good bye" in the robot mode, the user is able to recognize the switch from the robot mode to the avatar mode more clearly.

In the above communication robot, the first operational criterion may be updated based on a history of the communication. If there is a change in the operation of the robot mode after repeated communication, the user is able to feel a stronger attachment for the communication robot that operates in the robot mode.

Further, the above communication robot includes a notification part for notifying which one of the robot mode and the avatar mode is exhibited. If the user is able to visually distinguish the timing when the robot operates in the robot mode from the timing when the robot operates in the avatar mode, the user is able to distinguish the two virtual personalities more clearly.

Further, in the above communication robot, when the communication arbitration unit has received the operation request from a rename operator that matches a preset condition, the communication arbitration unit may reject the operation request without asking the service user whether to allow the mode to be switched. If, for example, the user sets persons who he/she does not want to communicate with in advance, the user can save time and trouble. Alternatively, connections from those who are registered may be rejected, so that there is no possibility that the communication robot would be accessed by suspicious persons etc.

A control program of a communication, robot according to a second aspect of the present disclosure causes a computer to execute a communication arbitration step for exhibiting one of a robot mode for autonomously operating an operation part by applying a first operational criterion and an avatar mode for operating the operation part based on an operation instruction sent from a remote operator by applying a second operational criterion to arbitrate communication with a service user, in which the communication arbitration step includes a check step for operating, when it is intended to exhibit the avatar mode in accordance with an operation request from the remote operator, the operation part in the robot mode and asking the service user whether to allow the mode to be switched to the avatar mode. By providing the communication robot in which the above program is executed by the computer, the user can feel an attachment for the communication robot that operates in the robot mode, in a way similar to that in the first aspect.

The present disclosure enables the user to feel an attachment for the robot that is autonomously operating while achieving a communication function by an autonomous operation and a communication function by an operation based on an operation instruction given by a person who is in a remote place by one robot.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is one example of lookup tables in which operational criteria are described;

DESCRIPTION OF EMBODIMENTS

Figure 1:
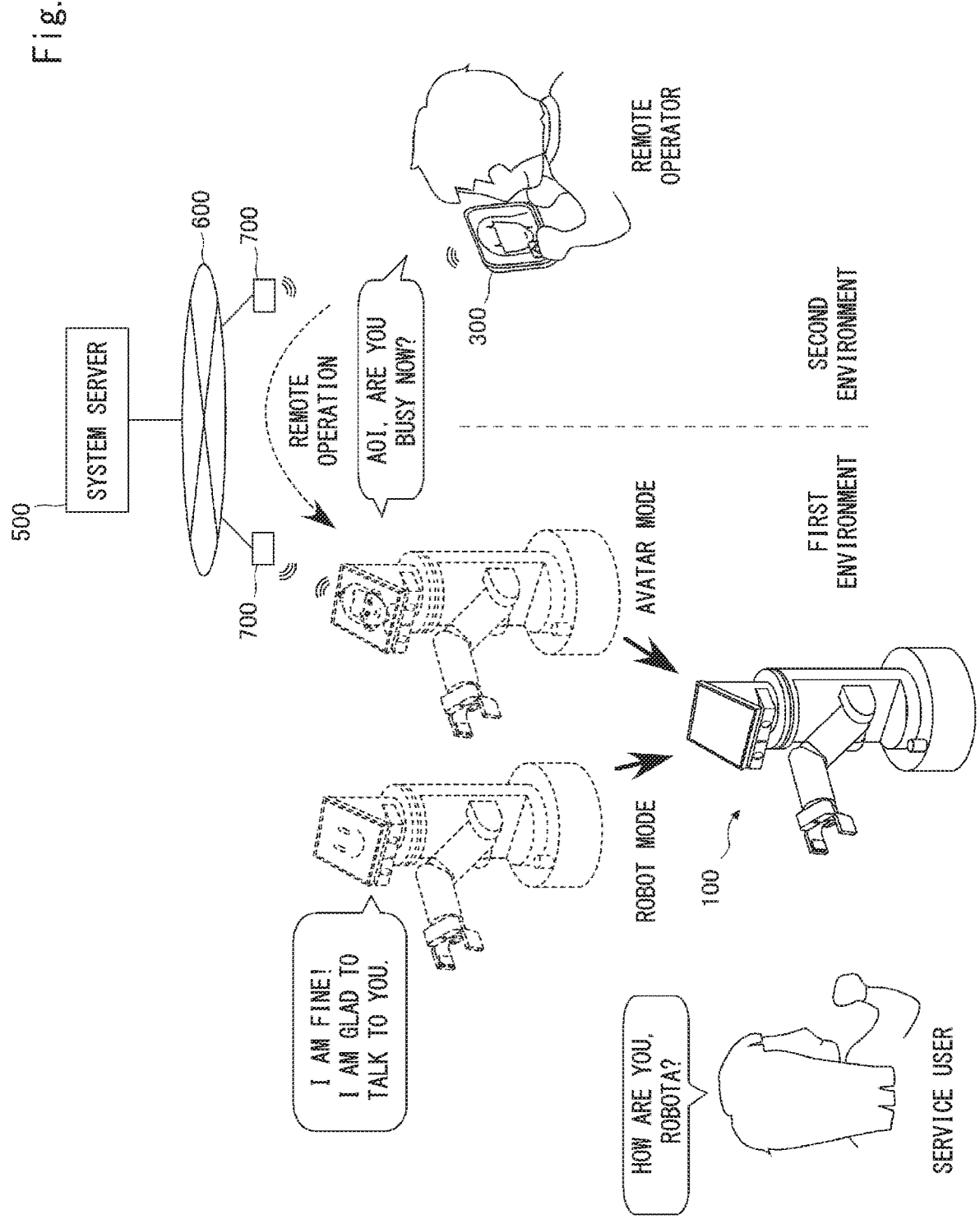
FIG. 1 is a conceptual diagram for describing an overall environment in which a communication robot according to an embodiment is used.

FIG. 1 is a conceptual diagram for explaining an overall environment in which a mobile robot 100, which is a communication robot according to an embodiment, is used. A service user coexists in an environment in which the mobile robot 100 operates, communicates with the mobile robot 100, or causes the mobiles robot 100 to execute specific work.

The mobile robot 100 exhibits one of a robot mode and an avatar mode that faces a service user. That is, the robot mode or the avatar mode exclusively appears with respect to the passage of time as long as the service user observes. It is possible, however, that, in a period in which the avatar mode is being exhibited, an operation of the avatar mode may be analyzed in the background in order to take over the communication in the robot mode after the communication in the avatar mode. In a similar way, in a period in which the robot mode is being exhibited, information on the operation in the robot mode may be transmitted to a remote terminal 300 in the background in order to take over the communication in the avatar mode after the communication in the robot mode. The details thereof will be explained later.

The mobile robot 100 autonomously operates when it is in the robot mode. When, for example, the service user says "How are you, Robota?" to the mobile robot 100, which is named Robota, the mobile robot 100 analyzes the voice of the service user. Then the mobile robot 100 makes a response by a synthetic sound, like "I am fine! I am glad to talk to you." as an appropriate response to the speech made by the service user. In the robot mode, the mobile robot 100 plans and executes the response to the action performed by the service user by itself.

When the mobile robot 100 is in the avatar mode, the mobile robot 100 operates based on an operation instruction by a remote operator. The remote operator operates the remote terminal 300 in a second environment, which is located away from a first environment, thereby transmitting the operation instruction to the mobile robot 100. When, for example, the remote operator says "Aoi, are you busy now?" to the remote terminal 300, trying to talk to Aoi, who is the service user, the mobile robot 100 utters "Aoi, are you busy now?" through a speaker. While the mobile robot 100 operates based on an operation instruction sent from the remote operator in the avatar mode, not all the operations in the operation parts of the mobile robot 100 are instructed by the remote operator, and the mobile robot 100 analyzes the operation instruction and converts the operation instruction into specific operations of the operation parts, or generate accompanying, operations.

In the first environment, the mobile robot 100 is connected to the Internet 600 via a wireless router 700. Further, in the second environment, the remote terminal 300 is connected to the Internet 600 via a wireless router 700. A system server 500 is connected to the Internet 600. The system server 500 is interposed between the mobile robot 100 and the remote terminal 300, passes an operation request or an operation instruction from the remote terminal 300 to the mobile robot 100, and passes imaging data or voice data from the mobile robot 100 to the remote terminal 300.

While the Internet is used as a connection network in this embodiment, another network such as an intranet may instead be used. Further, instead of using the network, the mobile robot 100 and the remote terminal 300 may be directly connected to each other by proximity communication such as Bluetooth (registered trademark).

The remote terminal 300, which is, for example, a tablet terminal, includes an input unit and a display unit. The input unit, which is, for example, a touch panel, enables to select a menu item displayed on the display unit. The remote terminal 300 generates an operation request and an operation instruction in accordance with the menu item that has been selected, and transmits them to the mobile robot 100. Further, the input unit includes a microphone, takes in the voice of the remote operator, converts this voice into a voice signal, and transmits this voice signal to the mobile robot 100 as a part of the operation instruction. The display unit displays an image of image data received from the mobile robot 100, and the remote operator is able to visually recognize a surrounding environment of the mobile robot 100 and the service user indirectly. Further, the remote terminal 300 includes a speaker, and reproduces the voice signal sent from the mobile robot 100. Accordingly, the remote terminal 300 is able to indirectly listen to the voice of the service user.

Figure 2:
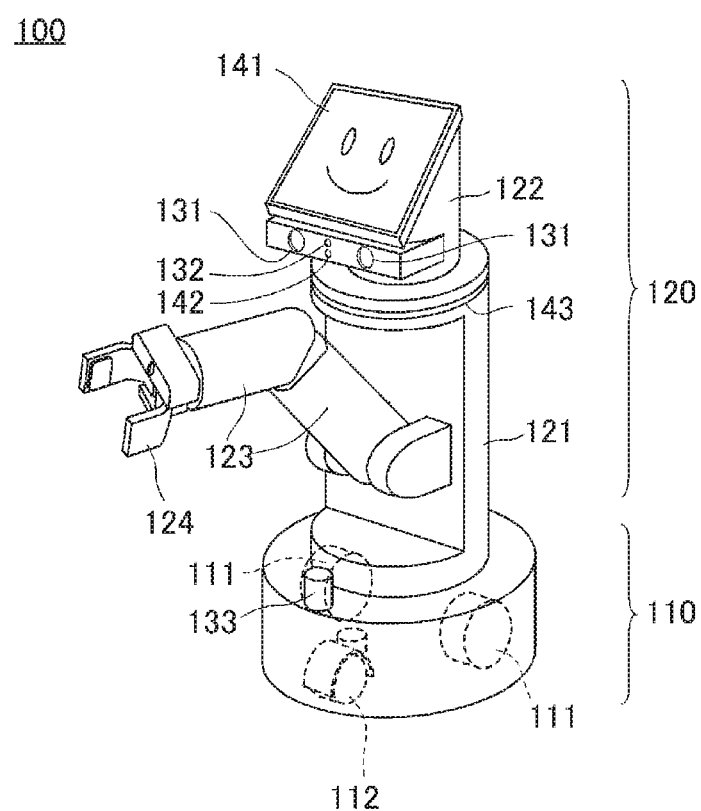
FIG. 2 is an external perspective view showing a mobile robot.

FIG. 2 is an external perspective view of the mobile robot 100. The mobile robot 100 is mainly composed of a cart part 110 and a main body part 120. The cart part 110 supports two driving wheels 111 and one caster 112, each of which contacting the traveling surface, inside a housing having a cylindrical shape. The two driving wheels 111 are disposed in such a way that the rotational axes thereof match each other. The driving wheels 111 are rotationally driven independently from each other by a motor (not shown). The caster 112 is a trailing wheel which is disposed so that a turning axis extending in the vertical direction from the cart part 110 supports the wheels so that there is some space between it and the rotation axes of the wheels, and tracks in accordance with a moving direction of the cart part 110.

The cart part 110 includes a laser scanner 133 in a peripheral part of an upper surface. The laser scanner 13) scans a certain range in a horizontal surface for each step angle, and outputs results of detecting whether an obstacle exists in each direction. Further, when an obstacle exists, the laser scanner 133 outputs the distance to the obstacle.

The main body part 120 mainly includes a trunk part 121 mounted on an upper surface of the cart part 110, a head part 122 placed on an upper surface of the trunk part 121, an arm 123 supported on a side surface of the trunk part 121, a hand 124 located at the tip end part of the arm 123, and an LED bar 143. The arm 123 and the hand 124 are driven via a motor (not shown), grip various objects in a controlled posture, or perform a gesture for expressing emotions. The trunk part 121 can be rotated about the vertical axis with respect to the cart part 110 by a driving force of the motor (not shown). Therefore, the mobile robot 100 may perform a gesture in an exaggerated way with an operation of the trunk part 121.

The LED bar 143, which is a light emitting device including a plurality of LEDs and a light guide material, is placed in an outer peripheral part having an annular shape in the upper part of the trunk part 121 in such a way that each of the LEDs emits light in a radiation direction with respect to the vertical axis. The LED bar 143 is able to change the luminescent color and the blinking cycle. By determining the luminescent color in advance, for example, it is possible to notify the service user of information regarding whether the mobile robot 100 at the present time is in the robot mode or the avatar mode.

The head part 122 mainly includes a stereo camera 131, a microphone 132, a speaker 142, and a display panel 141. The stereo camera 131 has a structure in which two carriers units having the same angle of view are arranged to be separated from each other, and outputs images captured by the respective camera units as image data.

The microphone 132 converts a sound generated in a surrounding environment or a voice of the service user into a voice signal. The speaker 142 emits a voice generated by the mobile robot 100 or a voice received from the remote terminal 300.

The display panel 141, which is, for example, a liquid crystal panel, displays a face of a character set so as to correspond to the robot mode by animations, or displays the face of a remote operator set so as to correspond to the avatar mode by a video image. Further, the display panel 141 is also able to notify the service user of information regarding the mobile robot 100 by displaying this information by a text or an icon. By displaying the face of the character on the display panel 141, it is possible to give an impression that the display panel 141 is a pseudo head part to the service user. Further, the display panel 141 may be configured to include a touch panel on the display surface and accept input of instructions from the user.

The head part 122 can be rotated about the vertical axis with respect to the trunk part 121 by a driving force of a motor (not shown). Therefore, the stereo camera 131 is able to capture an image of a target object in a desired direction, and the display panel 141 is able to display a display content in a desired direction. The mobile robot 100 is also able to swing the head part 122 as a gesture for expression emotions.

Figure 3:
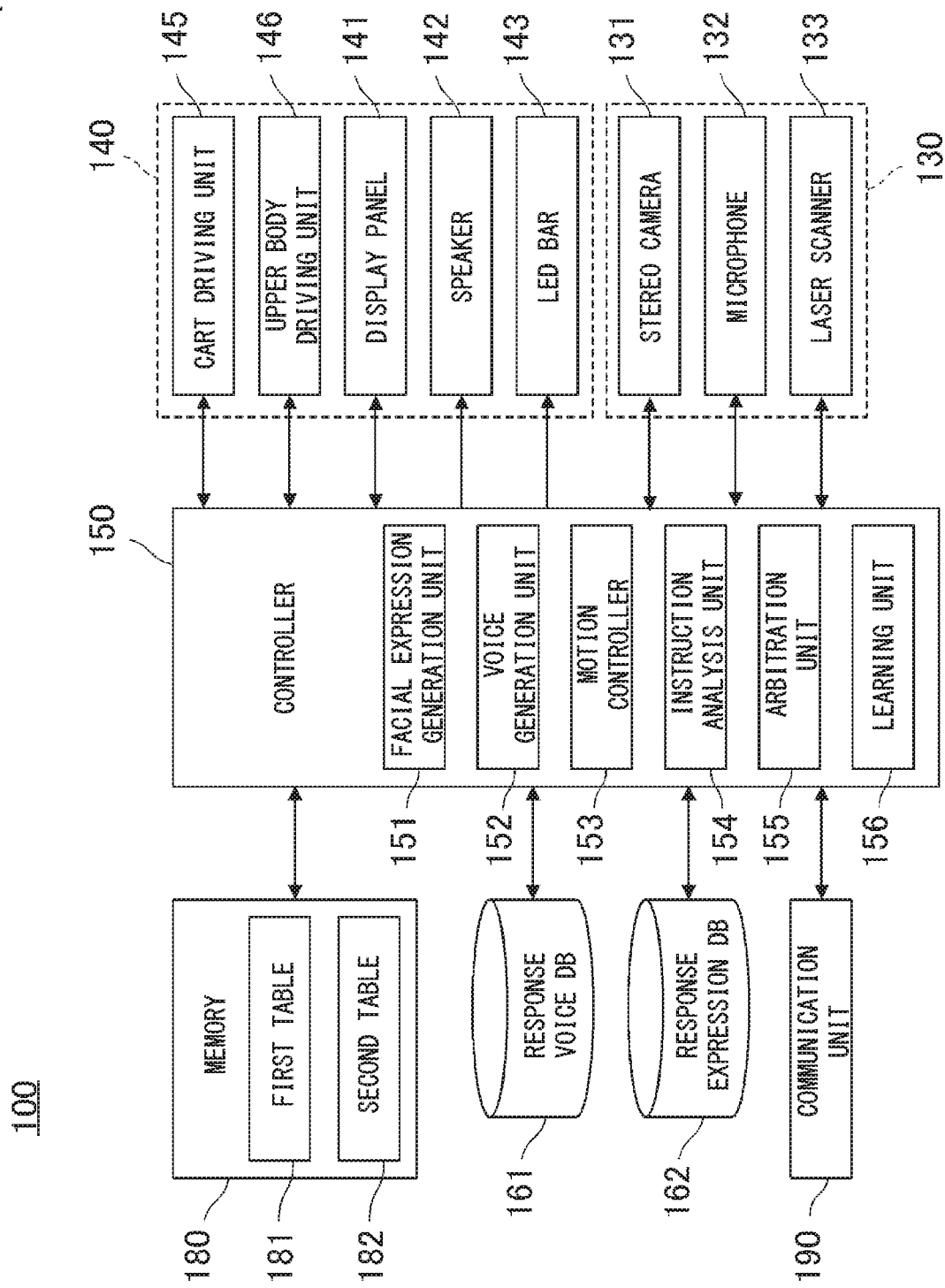
FIG. 3 is a control block diagram of the mobile robot.

FIG. 3 is a control block diagram of the mobile robot 100. While main components that relate to the communication with the service user are described in this example, the mobile robot 100 may include other components, and other elements that contribute to the communication may be added thereto.

A controller 150, which is, for example, a CPU, is stored in a control unit included in, for example, the trunk part 121. A cart driving unit 145, an upper body driving unit 146, a display panel 141, a speaker 142, and an LED bar 143 are components of an operation part 140 that operate by control by the controller 150.

The cart driving unit 145 includes the driving wheels 111, and a driving circuit and a motor for driving the driving wheels 111. The controller 150 sends a drive signal to the cart driving unit 145, thereby executing rotation control of the driving wheels. Further, the controller 150 receives a feedback signal such as an encoder from the cart driving unit 145 and grasps the moving direction and the moving speed of the cart part 110.

The upper body driving unit 146 includes a gripping part including the arm 123 and the hand 124, the trunk part 121 and the head part 122, and a driving circuit and a motor for driving them. The controller 150 sends a drive signal to the upper body driving unit 146, thereby achieving a gripping operation or a gesture. Further, the controller 150 receives a feedback signal such as an encoder from the upper body driving unit 146 and grasps the position and the moving speed of the arm 123 and those of the hand 124, and the direction and the rotation speed of the trunk part 121 and those of the head part 122.

The display panel 141 receives an image signal generated by the controller 150 and displays the image signal. Further, as described above, the controller 150 generates image signals of the face of the character or the face of the remote operator, and causes the generated image signals to be displayed on the display panel 141. When the display panel 141 includes a touch panel, the display panel 141 transmits a touch signal to the controller 150.

The speaker 142 converts a voice signal generated by the controller 150 or a voice signal received from the remote terminal 300 into audible sound waves. The LED bar 143 receives a light emitting signal from the controller 150 to cause the LED to emit light. In this embodiment, besides a physical movement of the movable part, display of images, pronunciation/speech, and light emission that may affect the service user are also performed by the mobile robot 100.

A stereo camera 131, a microphone 132, and a laser scanner 133 are elements of an acquisition unit 130 for enabling the mobile robot 100 to acquire the state of an external environment or an action to the mobile robot 100. The stereo camera 131 captures an image of a surrounding environment in accordance with a request from the controller 150, and passes an imaging signal to the controller 150. The controller 150 executes image processing using the imaging signal and converts the imaging signal into imaging data in accordance with a predetermined format in order to transmit the imaging data to the remote terminal 300. The microphone 132 converts sounds generated in a surrounding environment or a voice of the service user into a voice signal and passes the converted signal to the controller 150. The laser scanner 133 detects whether there is an obstacle in the moving direction in accordance with a request from the controller 150 and passes a detection signal, which indicates the result of the detection, to the controller 150.

A memory 180 is a non-volatile recording medium, and may be, for example, a solid state drive. The memory 180 stores, besides a control program for controlling the mobile robot 100, various parameter values, functions, lookup tables and the like to be used for control. The memory 180 especially stores a first table 181 and a second table 182. The first table 181 is a lookup table which describes a first operational criterion, which is a criterion for operating the operation part 140, when the robot mode is exhibited. The second table 182 is a lookup table which describes a second operational criterion, which is a criterion for operating the operation part 140, when the avatar mode is exhibited. The first table 181 and the second table 182 may each include an adjusted learned model for determining an operation of the target operation part 140 to match the operational criterion with respect to the input of predetermined specific parameters.

A response voice DB 161, which is a response voice database, is composed of, for example, a recording medium of a hard disc drive. The response voice DB 161 is organized, for example, as a corpus. Individual terms are stored with reproducible speech data for each voice tone.

The response expression DB 162, which is a response expression database, is composed of, for example, a recording medium such as a hard disc drive. The response expression DB 162 is organized, for example, as a Russell's circumplex model, and stores concrete video image data of facial expressions and emotions indicated by the facial expressions in association with each other for each of various characters.

A communication unit 190, which is, for example, a wireless LAN unit, performs radio communication with the wireless router 700. The communication unit 190 receives an operation request or an operation instruction sent from the remote terminal 300 and passes the received request or instruction to the controller 150. Further, the communication unit 190 transmits the imaging data acquired by the stereo camera 131, voice data of the voice emitted from the speaker 142 or the like to the remote terminal 300 in accordance with the control by the controller 150. The imaging data in this case includes voice data acquired by through microphone 132.

The controller 150 also serves as a function calculation unit executing various calculations regarding control or processing. A facial expression generation unit 151, a voice generation unit 152, a motion controller 153, an instruction analysis unit 154, an arbitration unit 155, and a learning unit 156 are examples of the function calculation unit.

The facial expression generation unit 151 determines the facial expression of a character to be displayed on the display panel 141 in the robot mode and outputs the determined facial expression. When, for example, the character is displayed with such a facial expression that it expresses compassion for the service user's emotion, first, the facial expression generation unit 151 analyzes the image signal received from the stereo camera 131, recognizes the face of the service user, and estimates the emotion of the service user. For example, the facial expression generation unit 151 extracts a size of pupils, a degree of descent of outer eye corners, a degree of rise of mouth corners, presence or absence of perspiration, a degree of wrinkles, and the like to estimate the emotion of the service user. For example, the facial expression generation unit 151 is able to estimate the emotion of the service user using a learned model obtained by performing machine learning using training data in which the above features and the respective emotions are associated with each other. Next, the facial expression generation unit 151 determines the emotion that the mobile robot 100 should exhibit in accordance with the emotion of the service user that has been estimated. Then the facial expression generation unit 151 acquires video image data that corresponds to this emotion from a response expression DB 162, converts the acquired video image data into a display signal, and transmits the display signal to the display panel 141.

In this embodiment, it is assumed that the image data of the face image of the remote operator captured by the remote terminal 300 is received and the received image data is displayed on the display panel 141 as a video image in the avatar mode. Alternatively, the received image data may be replaced by a character in which the remote operator is set and this character may be displayed. When the received image data is replaced by the character and this character is displayed, the facial expression generation unit 151 may analyze the image data or the voice data sent from the remote terminal 300, estimate the emotion of the remote operator, acquire the corresponding video image data from the response expression DB 162, and display the acquired video image data on the display panel 141.

The voice generation unit 152 determines the voice to be output from the speaker 142 and outputs the voice in the robot mode. When, for example, the voice generation unit 152 responds to the voice of the service user, first, the voice generation unit 152 analyzes the voice signal received through the microphone 132 using a general voice recognition technology and recognizes the speech made by the service user. Then the voice generation unit 152 selects an appropriate sentence as a conversation in response to the content of the speech made by the user that has been recognized, and collects speech data in accordance with the selected sentence from the response voice DB 161. The voice generation unit 152 combines the collected speech data, converts the combined data into a voice signal, and transmits this voice signal to the speaker 142.

In this embodiment, it is assumed that the voice data acquired by the remote terminal 300 is received, this received data is converted into a voice signal, and the voice signal is reproduced in the avatar mode. However, the voice generation unit 152 may convert the voice of the remote operator into a voice signal having a specific voice tone, convert text data received from the remote terminal, not the voice data, into a voice signal of a synthetic sound, and emit the voice signal from the speaker 142.

If the facial expression generation unit 151 replaces the face of the remote operator by a character and the voice generation unit 152 replaces the voice of the remote operator by a synthetic sound or the like in the avatar mode, this allows the service user to be released from having to strongly recognize the remote operator's individuality. On the other hand, since the remote operator does not have to expose his/her personal information, the remote operator can feel safe performing the remote operation. This conversion processing is effective when, for example, the remote operator is an employee of a nursing care service company.

The motion controller 153 plans how to operate the movable part of the cart driving unit 145 and the movable part of the upper body driving unit 146 and executes this plan. When, for example, the motion controller 153 executes a specific gesture, it generates control signals to be transmitted to the respective motors that move the respective movable parts. When it receives an instruction for fetching a specific conveyance object, it generates a route plan by referring to an environmental map and executes movement.

The instruction analysis unit 154 analyzes the operation request or the operation instruction that is sent from the remote terminal 300 and is acquired via the communication unit 190, and further converts the operation request or the operation instruction into an operation that may be executed by the mobile robot 100 in accordance with the results of the analysis. The instruction analysis unit 154 selects, for example, a gesture to be executed in synchronization with the operation instruction. Further, when the operation request or the operation instruction is sent by a voice of the remote operator, the instruction analysis unit 154 analyzes the voice signal that has been sent, starts the operation that corresponds to the results of the analysis, or reflects the content of the voice signal in the content of the response to be uttered next in the robot mode.

The arbitration unit 155 exhibits one of the robot mode in which the operation part 140 is autonomously operated and the avatar mode in which it is operated based on an operation instruction from the remote operator, and arbitrates communication with the service user. When, in particular, the arbitration unit 155 intends to exhibit the avatar mode in accordance with the operation request from the remote operator, the arbitration unit 155 operates the operation part 140 in the robot mode and asks the service user whether it allows the mode to be switched to the avatar mode.

When the service user has accepted the remote operation by the remote operator, the following communication may be performed among three parties, that is, the service user, the robot mode in which the mobile robot 100 autonomously operates, and the avatar mode in which the mobile robot 100 operates based on the operation instruction by the remote operator. In this case, the arbitration unit 155 analyzes the state of the communication, determines which one of the robot mode and the avatar mode to exhibit, and arbitrates communication among the three parties including the service user.

The learning unit 156 records the history of the communication and updates the content of the first table 181 in which the first operational criterion for the robot mode is described using this history. The recording file that stores the history of the communication is stored in the memory 180 and is read out as appropriate. The learning unit 156 updates, when, for example, the service user has praised a facial expression expressed by the robot mode at a certain time point during communication, the content of the first table 181 in such a way that the frequency with which this facial expression appears increases. Further, when the service user has said a word such as "fast" or "dangerous" during work that the service user has instructed the mobile robot 100 to do, the learning unit 156 updates the content of the first table 181 in such a way that the speed at which the movable part is operated becomes low.

Next, the first table and the second table will be explained. FIG. 4 is one example of the first table 181 in which the first operational criterion for the robot mode is described and the second table 182 in which the second operational criterion for the avatar mode is described.

In this embodiment, operational criteria that give a certain character to an operation are defined for each of the robot mode and the avatar mode so that the service user feels as if the mobile robot 100 has a personality. The first operational criterion is defined for the robot mode and the second operational criterion, is defined for the avatar mode. When the content of the operation and the atmosphere created by the operation in the robot mode and those in the avatar mode are different from each other, the service user feels as if the robot mode and the avatar mode that are alternately exhibited have personalities different from each other although only one mobile robot 100 is actually provided as hardware.

In this embodiment, a display character, a voice tone, a display color, a cart moving speed, an arm moving speed, a conversation speed, a selection term level, a temperament change frequency, and a gesture during the conversation are defined as items of the operational criteria. The display character, which is expressed by illustrations of various faces, may include, besides a face of a man and a face of a woman, personified animals or objects. In FIG. 4, No. 3 is selected in the robot mode, and "transfer", in which the face image of the remote operator is developed from the image data received from the remote terminal 300 and this face image is directly displayed, is selected in the avatar mode. In the avatar mode, instead of using the face image of the remote operator as described above, a character may be selected.

As to the voice tone, various tones including those of men or women are prepared in advance. In FIG. 4, No. 5 is selected in the robot mode, and "transfer", in which the voice emitted from the remote operator is directly reproduced, is selected in the avatar mode. While the speech data stored in the response voice DB 161 may be prepared for each voice tone as described above, only one voice tone may instead be prepared. When only one voice tone is prepared, the controller 150 converts the frequency or the like of the speech data in accordance with the set voice tone when this voice is reproduced.

Further, the robot mode may be selected, for example, by the service user via a touch panel. Further, the avatar mode may be set, for example, by the remote operator front the remote terminal 300.

The display color is a luminescent color of the LED bar 143. Green is selected in the robot mode and blue is selected in the avatar mode. The LED bar 143 functions as, besides an operation part of the mobile robot 100, a notification part that notifies which one of the robot mode and the avatar mode is exhibited. The service user can recognize that the mode is the robot mode when the LED bar 143 glows green and that the mode is the avatar mode when the LED bar 143 glows blue. The service user is able to distinguish the two virtual personalities more clearly if it can be recognized whether the mode is the robot mode or the avatar mode both from the display on the display panel 141 and the luminescent color of the LED bar 143.

The cart moving speed and the arm moving speed are the moving speed of the cart and that of the arm when the mobile robot 100 autonomously executes work specified by the service user in the robot mode, and are the moving speed of the cart and that of the arm when the mobile robot 100 executes work specified by the remote operator in the avatar mode. In FIG. 4, "low" is selected as the cart moving speed and "low" is selected as the arm moving speed in the robot mode, "high" is selected as the cart moving speed and "middle" is selected as the arm moving speed in the avatar mode. By selecting the cart moving speed and the arm moving speed as described above, even when the mobile robot 100 executes a type of work in the robot mode that is similar to the work the robot 100 executes in the avatar mode, the service user gets an impression that the mobile robot 100 is acting in a relaxed manner in the robot mode and gets an impression that the mobile robot 100 is acting in a crisp manner in the avatar mode.

The conversation speed indicates at which speed the voice signal generated by the voice generation unit 152 is reproduced by the speaker 142. In FIG. 4, "low" is selected in the robot mode, and the speed cannot be selected in the avatar mode since the voice emitted by the remote operator is directly reproduced. By setting the conversation speed, the service user gets an impression that the mobile robot 100 is speaking in a relaxed voice in the robot mode.

The selection term level indicates which one of formal wording and informal wording to select when the voice generation unit 152 selects an appropriate sentence as the conversation. For example, the formal wording is denoted by "A", the informal wording is denoted by "C", and the intermediate between them is denoted by "B". In FIG. 4, "C" is selected in the robot mode, and the selection term level cannot be selected in the avatar mode since the voice emitted by the remote operator is directly reproduced. By setting the selection term level, the service user gets an impression that the mobile robot 100 is speaking in a friendly manner in the robot mode.

The temperament change frequency expresses how frequently delight, anger, sorrow, or pleasure expressed by facial expression indicated by a display character or by a gesture during conversation should be changed. When, for example, the service user utters a word that makes fun of the mobile robot 100 a little, "high" is selected when it is intended to express anger and "low" is selected when it is intended to express that the mobile robot 100 is keeping calm. In FIG. 4, "middle" is selected in the robot mode, and "low" is selected in the avatar mode. Depending on the setting of the temperament change frequency, the service user gets an impression that the mobile robot 100 is childish in the robot mode and gets an impression that the mobile robot 100 is keeping calm in the avatar mode.

The gesture during conversation indicates the degree of the gesture executed in accordance with the content of the conversation. It is defined, for example, how high the hand 124 should be raised when the mobile robot 100 poses a question. In FIG. 4, "middle" is selected in the robot mode, and "small" is selected in the avatar mode. The gesture to be executed is not limited to the motion of the arm 123 or the hand 124 and may be swing of the head part 122 or the cart part 110. By setting the gesture during conversation, the service user gets an impression that the mobile robot 100 behaves in an exaggerated manner in the robot mode, and gets an impression that the mobile robot 100 behaves in a detached manner in the avatar mode.

As described above, by defining the operational criteria for each of the robot mode and the avatar mode, an impression that the service user receives when the operation is performed in the robot mode becomes greatly different from an impression that the service user receives when the operation is performed in the avatar mode. Therefore, the service user is able to intuitively recognize the switch from the robot mode to the avatar mode or from the avatar mode to the robot mode.

Figure 5:
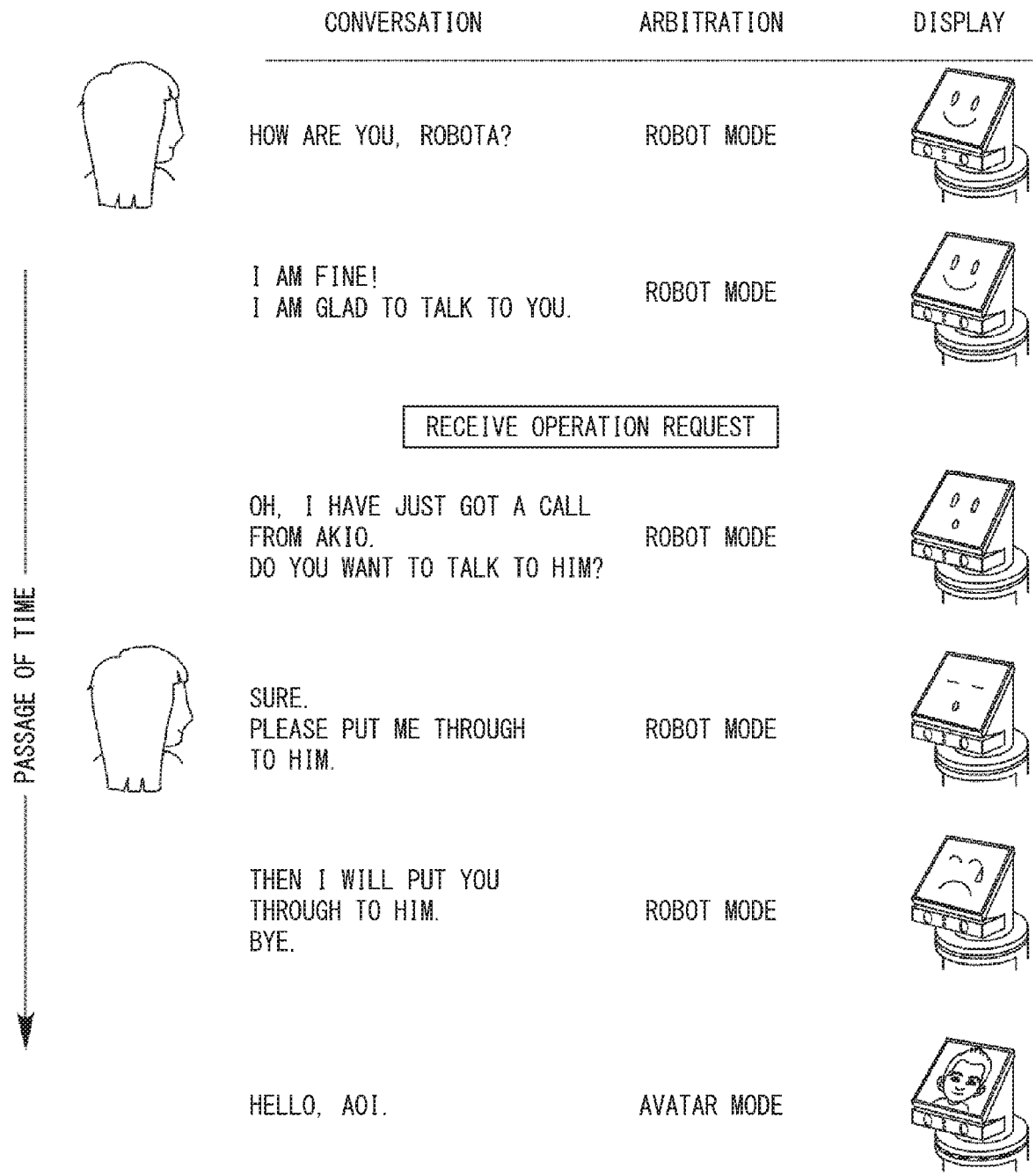
FIG. 5 is a diagram showing one example of a state in which a robot mode is switched to an avatar mode.

FIG. 5 is a diagram showing one example of a state in which the robot mode is switched to the avatar mode. FIG. 5 indicates the passage of time from top to bottom, the content of the conversation in the right-left direction, modes exhibited by the arbitration unit 155 during the conversation, and the content displayed on the display panel 141 during the conversation. When the content of the conversation is a speech made by a woman, who is the service user, illustrations of the woman are shown on the left of the speeches.

When the woman says "How are you, Robota?" to the mobile robot 100 the arbitration unit 155 recognizes the speech made by the woman, who is the service user, exhibits the robot mode, and waits while the woman is talking. At this time, the display panel 141 displays the character set in the first table, and the LED bar 143 emits light with a display color set in the first table.

When the arbitration unit 155 detects that there is a break in the speech made by the woman, the arbitration unit 155 causes the controller 150 to start operation in the robot mode. In this example, the voice generation unit 152 replies "I am fine! I am glad to talk to you." as an appropriate response in response to the content of the speech. The controller 150 may refer to the first table 181 and perform a gesture for expressing joy.

Assume a case in which the arbitration unit 155 has accepted an operation request from the remote terminal 300. The arbitration unit 155 checks information regarding the remote operator included in a request signal of the operation request without immediately switching the robot mode to the avatar mode, and asks the service user whether to allow the mode to be switched to the avatar mode while keeping the mode in the robot mode. For example, the facial expression generation unit 151 selects, from the response expression DB 162, the facial expression that is appropriate for the inquiry and displays the selected facial expression on the display panel 141. Further, the voice generation unit 152 incorporates information regarding the remote operator, collects, for example, a sentence like "Oh, I have just got a call from Akio. Do you want to talk to him?" from the response voice DB 161, and emits this sentence from the speaker 142. Further, if the remote operator is registered in advance and the information is stored in the memory 180, this information may be read out and displayed on the display panel 141. The information regarding the remote operator included in the request signal of the operation request may be displayed on the display panel 141.

The arbitration unit 155 waits for a response from the service user. When the service user has given a response indicating that he/she allows the mode to be switched to the avatar mode, like "Sure. Please put me through to him.", as shown in FIG. 5, the arbitration unit 155 starts preparation to switch the mode to the avatar mode. On the other hand, when the service user has given a response indicating that he/she rejects the mode switching to the avatar mode, like "I would rather not", the arbitration unit 155 continues the communication in the robot mode, and transmits a rejection notification to the remote terminal 300 in the background. Upon receiving the rejection notification, the remote terminal 300 notifies the remote operator that the request has been rejected by displaying a rejection notification or the like on the display unit.

When the service user has allowed the mode to be switched to the avatar mode, the arbitration unit 155 executes an operation of exiting the robot mode as a set of preparation operations for switching the mode to the avatar mode. As the exit operation, for example, the facial expression generation unit 151 selects a facial expression indicating sadness of exiting from the response expression DB 162 and displays the selected facial expression on the display panel 141. Further, the voice generation unit 152 collects a sentence such as "Then I will put you through to him. Bye." from the response voice DB 161, and emits the voice from the speaker 142. After the exit operation by the robot mode is ended, the arbitration unit 155 exhibits the avatar mode.

After the avatar mode is exhibited, the display panel 141 displays a face image of the remote operator in accordance with the setting in the second table, and the LED bar 143 emits light with a display color set in the second table. Then the voice signal received from the remote terminal 300, like "Hello, Aoi.", is reproduced.

As described above, the arbitration unit 155 arbitrates the switch from the robot mode to the avatar mode, whereby the service user is able to make a transition from the communication for the robot mode to the communication for the avatar mode without a feeling of strangeness. Further, since the robot mode and the avatar mode are clearly differentiated from each other, the service user tends to feel an attachment for the robot mode in which the mobile robot 100 autonomously operates. When, in particular, the robot mode executes a unique operation and creates a unique atmosphere in accordance with the first operational criterion, the service user feels that the robot mode has a virtual personality, which enables the service user to feel more personal connection to the mobile robot 100 which exhibits the robot mode. On the other hand, the avatar mode that is operated in accordance with the second operational criterion, which is different from the first operational criterion, is connected to the user's feeling that the mobile robot 100 is operated by somebody from a remote place, and this connection is further strengthened as the usage of the mobile robot 100 proceeds. Therefore, it can be estimated that the attachment feeling of the user for the robot mode is further distinct from the feeling of the user for the avatar mode.

Figure 6:
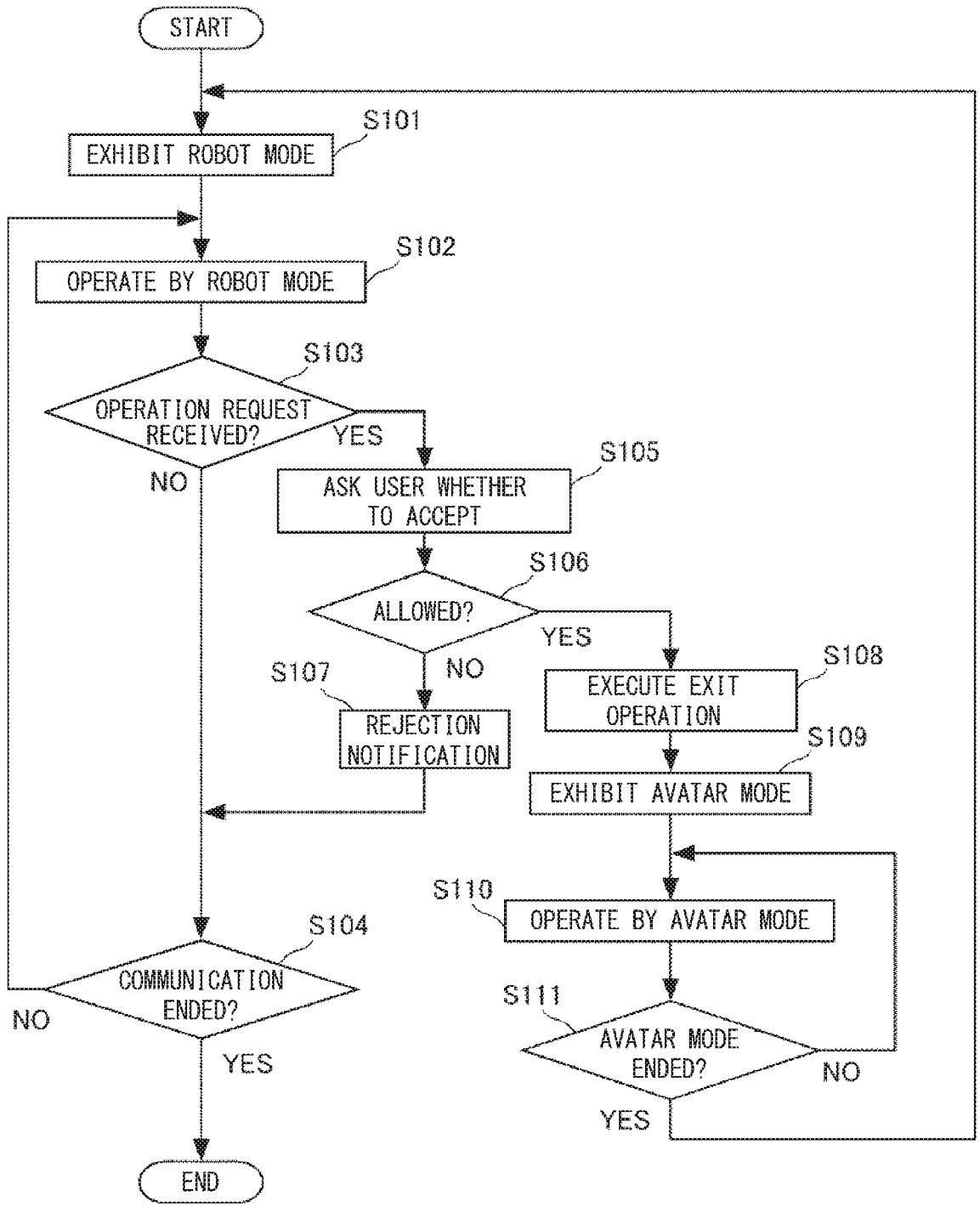
FIG. 6 is a process flowchart of communication.

Next, processing of the controller 150 when communication is performed will be explained. FIG. 6 is a process flowchart of the communication. The flow starts when the controller 150 detects an action by the service user or detects an operation request from the remote operator.

The arbitration unit 155 causes the robot mode to be exhibited in Step S101. In a case in which the mobile robot 100 is started upon detection of an operation request from the remote operator as well, the arbitration unit 155 causes the robot mode to be exhibited first.

Then the process proceeds to Step S102, where the controller 150 refers to the operational criteria of the first table 181 and executes the operation by the robot mode. The voice generation unit 152 analyzes, for example, the content of the speech made by the service user or the flow of the past conversation, collects an appropriate sentence from the response voice DB 161, and makes a speech. Further, the voice generation unit 152 may change the character to be displayed on the display panel 141 or execute a gesture depending on the content of the speech. After the set of operations has been executed by the robot mode, the process moves to Step S103.

The arbitration unit 155 checks, in Step S103, whether it an operation request has been received from the remote terminal 300. When it has been confirmed that the operation request has not been received, the process proceeds to Step S104. The controller 150 determines whether a series of communication has ended in Step S104. When, for example, the voice generation unit 152 has uttered "Bye" in Step S102, it is determined that the communication has ended. When it is determined that the communication has not yet ended, the process goes back to Step S102 to continue the communication in the robot mode. When it is determined that the communication has ended, a series of processing is ended.

When it has been confirmed, in Step S103, that the operation request has been received, the process proceeds to Step S105. The arbitration unit 155 checks, in Step S105, whether the service user accepts the remote operation by the remote operator while the mode is being kept to the robot mode, as described with reference to, for example, FIG. 5. When the service user has rejected the remote operation (NO in Step S106), the process proceeds to Step S107, where a rejection notification indicating that the operation request will not be accepted is sent to the remote terminal 300, and then the process goes to Step S104 while the robot triode is being kept.

When the service user has allowed the remote operation (YES in Step S106), the process proceeds to Step S108, where the arbitration unit 155 executes the operation of exiting the robot mode, as described with reference to, for example, FIG. 5. After the operation of exiting the robot mode has been completed, the process proceeds to Step S109, where the arbitration unit 155 causes the avatar mode to be exhibited.

Then the process moves to Step S110, where the instruction analysis unit 154 analyzes the operation instruction from the remote operator and the controller 150 operates each part of the mobile robot 100 in accordance with the results of the analysis. When, for example, an operation instruction for passing a mug that is placed on a nearby table to the service user has been received, the controller 150 causes the motion controller 153 to execute this operation. Further, when the voice signal is sent from the remote terminal 300, this voice signal is reproduced. Each of these operations is executed in accordance with the operational criteria of the second table 182.

In Step S111, the arbitration unit 155 cheeks whether the operation instruction from the remote terminal 300 has been interrupted or whether a notification indicating end of the remote operation has been sent, and determines whether to end the avatar mode. When it has been determined that the avatar mode should be continued, the process goes back to Step S110. When it has been determined that the avatar mode should be ended, the process goes back to Step S101.

Further, while it is assumed that there is one remote operator in the aforementioned embodiment, the remote operator may be any one of a plurality of persons. In this case, a plurality of second tables 182, the second operational criterion being defined in each of the plurality of second tables 182, may be established in accordance with the scheduled remote operator so that the service user is able to recognize who the remote operator is. For example, the remote operator who operates the remote terminal 300 inputs ID first. The instruction analysis unit 154 recognizes this ID, and the controller 150 applies the second table 182 that corresponds to this ID in the avatar mode.

In this case, in accordance with an attribute of the person who has requested the remote operation, an aspect in which the information regarding this person is presented to the service user may be changed. For example, depending on whether a person who is requesting the remote operation is a person registered as a family member or a person registered as an employee of a nursing care service company, the character to be displayed on the display panel 141 may be set to have a friendly facial expression or a formal facial expression. Further, the gesture to be executed or the response sentence to be uttered may be varied.

Further, the arbitration unit 155 may reject an operation request without asking the service user whether to allow the mode to be switched when it has received an operation request from a remote operator that matches a preset condition. When, for example, a condition that operation requests from "persons other than the persons registered in advance" should be rejected is set, an operation request from one of these persons is rejected and a rejection notification is automatically sent to the remote terminal that has sent this operation request without notifying the service user that the operation request has been made and this operation request has been rejected. According to the above setting, there is no possibility that the mobile robot 100 would be accessed by suspicious persons etc. Further, a time zone during which acceptance of an operation request sent from a specific remote operator is rejected may be set. For example, an operation request sent from an employee of a nursing care service company during the night may be set to be prohibited.

Further, in the aforementioned embodiments, the arbitration unit 155 exhibits the avatar mode after it executes the exit operation in the robot mode. By executing the exit operation in the robot mode as described above, the service user is able to recognize the switch from the robot mode to the avatar mode more clearly. However, the exit operation may not be executed. For example, even when the exhibition operation is executed in the avatar mode such as executing a specific gesture at a stage at which the avatar mode is exhibited, it is possible to enable the service user to recognize the switch from the robot mode to the avatar mode more clearly.

Further, each of the response voice DB 161 and the response expression DB 162 may not be included in the mobile robot 100, and may be a storage device connected to the Internet 600. In this case, the facial expression generation unit 151 and the voice generation unit 152 access the response voice DB 161 and the response expression DB 162 via the communication unit 190. Further, some of the elements described as the function calculation unit of the controller 150 may be provided in the system server 500. For example, the processing executed by the voice generation unit 152 and the learning unit 156 may be processed by the system server 500. In this case as well, the controller 150 performs request of processing and acquisition of the results via the communication unit 190.

Further, while the mobile robot 100 that is movable has been described as one example of the communication robot in the aforementioned embodiment, the communication robot may be an unmovable robot. For example, the mobile robot 100 may be a robot including a housing that imitates an animal in appearance.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical, disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A communication robot comprising:
an operation part;
a communication arbitration unit configured to exhibit a robot mode for autonomously determining and outputting a voice in response to a voice of a service user by autonomously operating the operation part and an avatar mode for operating the operation part based on an operation instruction sent from a remote operator to arbitrate communication with a service user; and
a memory configured to store a first operational criterion and a second operational criterion, the first operational criterion being a criterion for operating the operation part in the robot mode, and the second operational criterion being a criterion for operating the operation part in the avatar mode and different from the first operational criterion,
wherein the communication arbitration unit operates, when it is intended to exhibit the avatar mode in accordance with an operation request from the remote operator, the operation part in the robot mode and asks the service user whether to allow the mode to be switched to the avatar mode, and
wherein the first operational criterion and the second operational criterion define at least a temperament change frequency, the temperament change frequency being a frequency of emotion expressed by the operation part.

2. The communication robot according to claim 1, wherein the communication arbitration unit presents information regarding the remote operator to the service user via an operation by the robot mode when it asks the service user whether to allow the mode to be switched.

3. The communication robot according to claim 2, wherein the communication arbitration unit changes an aspect in which the information is presented to the service user in accordance with an attribute of the remote operator.

4. The communication robot according to claim 1, wherein the communication arbitration unit causes, when the service user has allowed the mode to be switched to the avatar mode, the avatar mode to be exhibited after the communication arbitration unit executes an exit operation in the robot mode.

5. The communication robot according to claim 1, wherein the first operational criterion is updated based on a history of the communication.

6. The communication robot according to claim 1, comprising a notification part for notifying which one of the robot mode and the avatar mode is exhibited.

7. The communication robot according to claim 1, wherein, when the communication arbitration unit has received the operation request from a remote operator that matches a preset condition, the communication arbitration unit rejects the operation request without asking the service user whether to allow the mode to be switched.

8. A non-transitory computer readable medium storing a control program of a communication robot for causing a computer to execute a reference step for referring to a first operational criterion and a second operational criterion stored a memory and a communication arbitration step for exhibiting a robot mode for autonomously determining and outputting a voice in response to a voice of a service user by autonomously operating an operation part and an avatar mode for operating the operation part based on an operation instruction sent from a remote operator to arbitrate communication with a service user, the first operational criterion being a criterion for operating the operation part in the robot mode, and the second operational criterion being a criterion for operating the operation part in the avatar mode and different from the first operational criterion, wherein
  the communication arbitration step comprises a check step for operating, when it is intended to exhibit the avatar mode in accordance with an operation request from the remote operator, the operation part in the robot mode and asking the service user whether to allow the mode to be switched to the avatar mode, and
  wherein the first operational criterion and the second operational criterion define at least a temperament change frequency, the temperament change frequency being a frequency of emotion expressed by the operation part.

9. The communication robot of claim 1, further comprising:
  a camera configured to capture an image of the service user,
  wherein the communication arbitration unit is configured to:
    estimate an emotion of the service user based on the image of the service user; and
    determine a facial expression displayed during the robot mode based on the estimated emotion of the service user.

10. The communication robot of claim 1, wherein the communication arbitration unit is configured to:
  obtain a feedback from the service user regarding a facial expression displayed during the robot mode; and
  adjust a frequency of the facial expression being displayed based on the feedback.

11. The non-transitory computer readable medium of claim 8, wherein the computer is configured to:
  obtain an image of the service user;
  estimate an emotion of the service user based on the image of the service user; and
  determine a facial expression displayed during the robot mode based on the estimated emotion of the service user.

12. The non-transitory computer readable medium of claim 8, wherein the computer is configured to:
  obtain a feedback from the service user regarding a facial expression displayed during the robot mode; and
  adjust a frequency of the facial expression being displayed based on the feedback.

13. The communication robot according to claim 1, wherein the first operational criterion and the second operational criterion define at least a moving speed of the operation part.

14. A communication robot comprising:
  an operation part;
  a communication arbitration unit configured to exhibit a robot mode for autonomously determining and outputting a voice in response to a voice of a service user by autonomously operating the operation part and an avatar mode for operating the operation part based on an operation instruction sent from a remote operator to arbitrate communication with a service user; and
  a memory configured to store the first operational criterion and the second operational criterion, the first operational criterion being a criterion for operating the operation part in the robot mode, and the second operational criterion being a criterion for operating the operation part in the avatar mode and different from the first operational criterion,
  wherein the communication arbitration unit operates, when it is intended to exhibit the avatar mode in accordance with an operation request from the remote operator, the operation part in the robot mode and asks the service user whether to allow the mode to be switched to the avatar mode, and
  wherein the first operational criterion and the second operational criterion define at least a gesture during conversation, the gesture during conversation being a degree of a gesture executed in accordance with a content of a conversation by the operation part.

* * * * *